(12) United States Patent
Ross et al.

(10) Patent No.: US 10,546,340 B1
(45) Date of Patent: Jan. 28, 2020

(54) SYSTEMS AND METHODS FOR ASSESSING NEEDS

(71) Applicant: MASSACHUSETTS MUTUAL LIFE INSURANCE COMPANY, Springfield, MA (US)

(72) Inventors: Gareth Ross, Amherst, MA (US); Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 658 days.

(21) Appl. No.: 15/287,503

(22) Filed: Oct. 6, 2016

Related U.S. Application Data

(60) Provisional application No. 62/238,020, filed on Oct. 6, 2015.

(51) Int. Cl.
| | |
|---|---|
| *G06Q 30/06* | (2012.01) |
| *G06Q 40/08* | (2012.01) |
| *G06Q 10/06* | (2012.01) |
| *G06N 5/04* | (2006.01) |

(52) U.S. Cl.
CPC ........... *G06Q 30/0631* (2013.01); *G06N 5/04* (2013.01); *G06Q 10/067* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 6,204,846 B1 * | 3/2001 | Little | G06F 3/04855 715/784 |
| 7,650,303 B2 * | 1/2010 | Loeper | G06Q 40/00 705/35 |
| 8,190,502 B2 * | 5/2012 | Moran | G06Q 40/06 705/36 R |

(Continued)

FOREIGN PATENT DOCUMENTS

WO  WO2016191959 A1 * 8/2016

OTHER PUBLICATIONS

He, S., et al., "Ontological User Profiling on Personalized Recommendations in E-Commerce," IEEE International Conference on e-Business Engineering, pp. 585-589, Dec. 1, 2008 (Year: 2008).*

*Primary Examiner* — Nicholas D Rosen
(74) *Attorney, Agent, or Firm* — Eric L. Sophir; Dentons US LLP

(57) ABSTRACT

Systems and methods assess the needs of customers using predictive modeling techniques, thereby reducing data entry efforts. A method receives customer data from a first database and provided by the user; generates an instruction to a second database and receives additional customer information received from external databases to generate a profile for the customer; generates a customer profile based on the data and additional data; determines missing data from the profile and a set of attributes; identifies a profile having a similar set of attributes and estimates the missing data using predictive modeling techniques to generate estimated customer information; pre-populates one or more missing fields of the full profile associated with the customer based on the estimated customer information; analyzes the full updated customer profile associated with the customer to a recommendation for the customer that will allow customers to fulfill one or more proposed future goals.

16 Claims, 7 Drawing Sheets

(56) References Cited

U.S. PATENT DOCUMENTS

| | | | | |
|---|---|---|---|---|
| 8,275,712 | B2* | 9/2012 | Vollmer | G06Q 20/10 705/1.1 |
| 8,407,106 | B1* | 3/2013 | Saad | G06Q 30/0631 434/318 |
| 8,458,063 | B2* | 6/2013 | Moore | G06Q 30/02 705/35 |
| 8,856,235 | B2* | 10/2014 | Zhou | G06Q 10/10 709/204 |
| 9,544,744 | B2* | 1/2017 | Postrel | H04W 4/12 |
| 9,684,634 | B2* | 6/2017 | Dong | G06F 17/18 |
| 9,996,881 | B2* | 6/2018 | Mdeway | G06Q 40/08 |
| 2004/0204070 | A1* | 10/2004 | August | H04M 1/274516 455/557 |
| 2006/0218068 | A1* | 9/2006 | Loeper | G06Q 40/00 705/35 |
| 2008/0162256 | A1* | 7/2008 | Moore | G06Q 30/02 705/35 |
| 2010/0100398 | A1* | 4/2010 | Auker | G06Q 10/087 705/4 |
| 2010/0306126 | A1* | 12/2010 | Moran | G06Q 40/06 705/36 R |
| 2012/0011064 | A1* | 1/2012 | Vollmer | G06Q 20/10 705/41 |
| 2013/0304658 | A1* | 11/2013 | Zhou | G06Q 10/10 705/319 |
| 2014/0081768 | A1* | 3/2014 | Hocking, Jr. | G06Q 30/0282 705/14.66 |
| 2014/0164287 | A1* | 6/2014 | Hyde | G06Q 40/06 705/36 R |
| 2014/0201173 | A1* | 7/2014 | Roth | G06F 16/9535 707/693 |
| 2015/0006206 | A1* | 1/2015 | Mdeway | G06Q 40/08 705/4 |
| 2015/0039540 | A1* | 2/2015 | Dong | G06F 17/18 706/12 |
| 2015/0140982 | A1* | 5/2015 | Postrel | H04W 4/12 455/418 |
| 2016/0117771 | A1* | 4/2016 | Macdonald | G06Q 40/06 705/36 R |

* cited by examiner

SYSTEMS AND METHODS FOR ASSESSING NEEDS

CROSS-REFERENCE TO RELATED APPLICATION

This application claims priority to U.S. Provisional Patent Application Ser. No. 62/238,020, filed on Oct. 6, 2015, which is hereby incorporated by reference in its entirety.

TECHNICAL FIELD

The present disclosure relates in general to insurance products, and more particularly, to predictive modeling techniques used to recommend products.

BACKGROUND

The completion of insurance forms, such as an insurance application, can be time-consuming for customers, agents, or any other person involved in the insurance business. Completing these forms often requires that customers provide numerous items of information. The conventional processes of obtaining the necessary information from a potential customer regarding an insurance product application are severely outdated and oftentimes implemented as manual processes that are extremely cumbersome. For example, insurance agents often have to manually key in the bulk of business data, such as the business name, address, driver names, driver addresses, and Vehicle Identification Number (VIN), and then provide insurance product information to the customer to obtain a sale.

These manual processes are extremely time consuming and prone to user error. Because of this time-consuming task of data-entry, the customer may not always finish the process and often leave the application incomplete.

For the aforementioned reasons, there is a need for an efficient method and/or system that improves or makes the customer experience faster to sell more insurance services or products.

SUMMARY

For the aforementioned reasons, there is a need for a more efficient and faster system and method for processing large data sets which would allow institutions to profile customers in a more efficient manner than possible with human-intervention data-driven analysis. There is a need for a network and computer-specific solution to reduce the level of data-entry efforts required from the customers. These features allow performing large work such as time-consuming analysis, data-entry tasks, filling out customer profiles, and generating insurance recommendations, in a more efficient manner than other approaches including manual work performed by humans or other conventional methods.

An embodiment for determining customer insurance needs comprises a method which comprises receiving inputted user data stored in a first database. The method comprises generating an instruction to a second database to transmit additional data associated with the user. The method comprises upon transmitting the first instruction to the second database, receiving and storing additional user data in the first database. The method comprises generating a customer profile based on the inputted user data and the additional user data. The method comprises determining missing data in the customer profile. The method comprises determining a set of attributes of the user based on the customer profile. The method comprises identifying another profile with the same set of attributes. The method comprises generating estimated data for the missing data based on the other profile having the same set of attributes. The method comprises generating a second instruction to update the customer profile to include the estimated data. The method comprises determining a financial priority for the updated customer profile and generating insurance recommendations for the updated customer profile using an insurance needs algorithm and based upon the financial priority.

Another embodiment for identifying insurance recommendations comprises a computer system having a first database, a second database, and a server. The server may be configured to receive inputted user data stored in a first database. The server may be configured to generate an instruction to the second database to transmit additional data associated with the user. The server may be configured to receive and store additional user data in the first database, upon transmitting the first instruction to the second database. The server may be configured to generate a customer profile based on the inputted user data and the additional user data. The server may be configured to determine missing data in the customer profile. The server may be configured to determine a set of attributes of the user based on the customer profile. The server may be configured to identify another profile with the same set of attributes. The server may be configured to generate estimated data for the missing data based on the other profile having the same set of attributes. The server may be configured to generate a second instruction to update the customer profile to include the estimated data. The server may be configured to determine a financial priority for the updated customer profile and generate an insurance recommendation for the updated customer profile using an insurance needs algorithm and based upon the financial priority.

BRIEF DESCRIPTION OF THE DRAWINGS

The present disclosure herein is described with reference to embodiments illustrated in the drawings, which form a part herein. Other embodiments may be used and/or other changes may be made without departing from the spirit or scope of the present disclosure. The illustrative embodiments described are not meant to be limiting of the subject matter presented herein.

DETAILED DESCRIPTION

Figure 1:
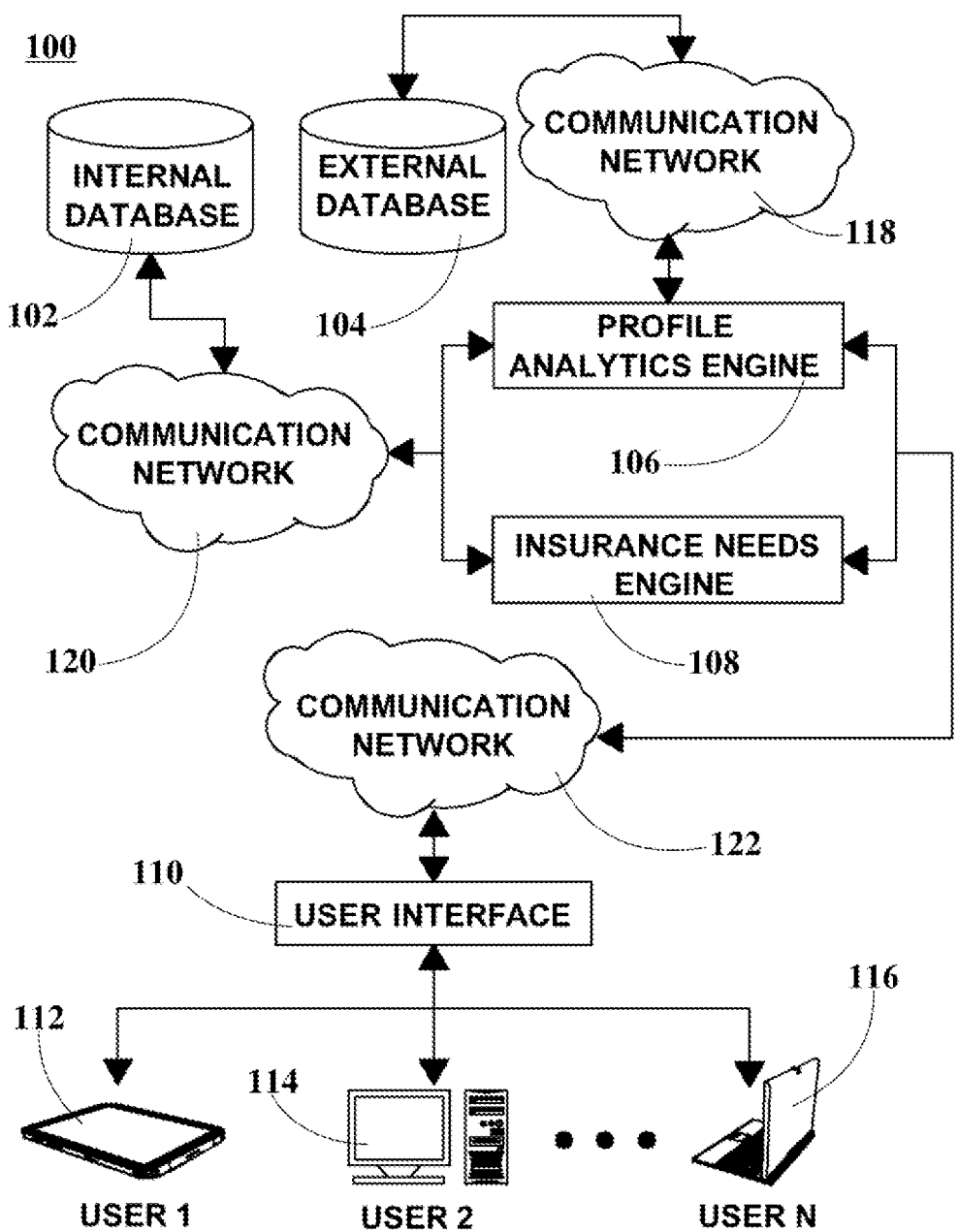
FIG. 1 is a block diagram illustrating a system architecture of an insurance needs system, according to an embodiment.

The present disclosure herein is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Additional Customer Information" refers to one or more attributes associated with a customer provided by external databases to an insurance needs system.

"Basic Customer Information" refers to one or more attributes associated with a customer provided by users to an insurance needs system via client computing device.

"Basic Profile" refers to a basic description of a customer that can include basic customer information and/or supplemental customer information provided by users, as well as, additional customer information received from external databases.

"Estimated customer information" refers to one or more attributes associated with a customer not provided by the customer or readily available from external databases and derived by estimating the insurance needs associated with the customer and other customer attributes using predictive modeling techniques.

"Full Profile" refers to the full description of a customer that includes: basic customer information and supplemental customer information provided by one or more users, additional customer information provided by one or more external databases, and the estimated customer information predicted by an insurance needs system.

"Persona" refers to non-personally identifiable information derived from the full profile of one or more customers and/or from an initial set of previously generated personas, such as, for example personas obtained from a third-party (e.g., purchased from a third-party persona vendor). The personas are used as a training data set for applying predictive modeling techniques to discover potentially predictive relationships.

"Supplemental Customer Information" refers to one or more attributes associated with a customer provided by one or more users to an insurance needs system via one or more client computing devices to modify and/or refine one or more fields of the pre-populated full profile associated with the customer.

The present disclosure describes systems and methods for assessing insurance needs of customers using predictive modeling techniques. The system describes an insurance needs system that uses basic customer information and additional customer information to generate a basic profile for the customer. The insurance needs system can additionally analyze the basic profile associated with the customer by employing predictive modeling techniques to generate estimated customer information. The systems and methods then pre-populate one or more fields of the full profile associated with the customer based on the use of said basic customer information and additional customer information contained within the basic profile, as well as with said estimated customer information. The systems and methods then analyze the full profile associated with the customer to generate one or more insurance-product recommendation including insurance product(s) that meet the needs of the customer and fulfill one or more proposed future goals of the customer.

The disclosed system architecture includes one or more components, such as, an internal database and an external database, one or more communication networks, a profile analytics engine, an insurance needs engine, a user interface and one or more client computing devices.

In some embodiments, a user creates a new account for a customer and provides basic customer information by interacting with a user interface running on a client computing device and coupled to the profile analytics engine via communication networks. The profile analytics engine receives and processes said basic customer information and receives additional customer information from one or more external databases. The profile analytics engine generates a basic profile for the customer based on the customer information and the additional customer information. The profile analytics engine then stores said basic profile at the internal database. The profile analytics engine then analyzes the basic profile associated with the customer to generate estimated customer information using predictive modeling techniques. The profile analytics engine then employs said estimated customer information to pre-populate one or more fields of the full profile associated the customer. The profile analytics engine then displays said full profile to the user and the user can then validate the estimated customer information and provide supplemental customer information to refine/modify one or more pre-populated fields of the full profile associated with the customer, if desired. The insurance needs engine then employs the full profile associated with the customer to identify the insurance needs associated with customer and generate one or more insurance-product recommendations that satisfy the insurance needs and future goals of the customer. The insurance needs engine then displays said insurance-product recommendations to the user via the user interface, and the user can then provide additional insurance-needs data to the insurance needs engine via the user interface to modify the insurance needs identified by the insurance needs engine, if desired. The insurance needs of the customer can be directed towards determining one or more insurance products, such as, for example health insurance, whole life insurance, term life insurance, universal life insurance, variable universal life (VUL), disability income insurance, annuities, long term care, and the like. The insurance needs engine can then generate a modified insurance-product recommendation based on the provided additional insurance-needs data and the full profile associated with the customer.

In some embodiments, a sub-system of the insurance needs system includes a profile analytics engine that further includes a data processing module and a prediction module. In some embodiments, a user creates a new account for a customer and provides basic customer information by interacting with a user interface running on a client computing device that is coupled to the profile analytics engine. The data processing module receives and processes basic customer information from the user and/or external databases to create a basic profile for the customer and store it in the internal database. In some embodiments, the data prediction module analyzes the customer's basic profile and uses predictive modeling techniques to estimate the insurance needs of the customer as well as other customer attributes. In these embodiments, the data prediction module:

uses the estimated customer information to pre-populate the full profile associated with the customer;

displays the customer's full profile to the user for validation purposes (the user can validate and/or refine one or more fields of the customer's full profile when needed);

uses the validated/adjusted pre-populated fields to better predict the remaining missing fields of the customer's full profile;

evaluates the performance of the predictive modeling technique being applied to estimate the customer's insurance needs and other customer attributes; and selects/applies the performance evaluation technique based on the amount and type of basic information known about the customer, and on the predictive model being applied.

In some embodiments, a sub-system of the insurance needs system includes an insurance needs engine that further includes an insurance recommendation module. In some embodiments, the insurance recommendation module operating within the insurance needs engine receives the full profile associated with the customer from the internal database. The insurance recommendation module then analyses said full profile to identify the insurance needs of the customer employing insurance tools (e.g., risk and/or underwriting analysis), data mining and other data processing. The insurance recommendation module then generates one or more insurance-product recommendations based on said insurance needs of the customers. The insurance recommendation module then stores said insurance-product recommendation at the internal database and the insurance needs engine displays said insurance-product recommendation to the user via client computing devices. The user can then provide additional insurance-needs data to the insurance recommendation module to adjust/modify the insurance needs of the customer, if desired.

In some embodiments, a computer-implemented method for assessing the insurance needs of customers using predictive modeling techniques includes the following steps:

creating a basic profile for a customer based on basic customer information provided by the user;

requesting additional customer information from one or more external databases to update the basic profile associated with the customer;

running a predictive modeling technique to generate estimated customer information;

pre-populating the full profile associated with the customer with said estimated customer information; displaying the full profile associated with the customer for validation purposes;

refining the basic profile associated with the customer, if desired; and recommending one or more insurance product for the customer.

In some embodiments, a computer-implemented method for recommending one or more insurance products for a customer includes the following steps: analyzing the full profile of the customer to determine the insurance needs of customer; generating and storing the insurance-product recommendation about one or more insurance products for the customer; and displaying said insurance-product recommendation to the customer through a user interface running on a client computing device.

Systems and methods for assessing the insurance needs of customer using predictive analytics reduce the level of data-entry effort required by users (e.g., insurance/financial agents or customers) to generate a full profile that can be analyzed to recommend one or more insurance products. In addition, these systems and methods can provide customers with insurance products that best fit the needs of the customer and allow the customer to meet one or more defined future goals while ensuring their financial stability as well as the welfare of the family of the customer.

Numerous other aspects, features and benefits of the present disclosure may be made apparent from the following detailed description taken together with the figures.

In some embodiments, an insurance company can implement a statistical analysis that deals with different aspects of an insurance transaction, such as, for example, extracting information from any data source, using predictive future trends and behavior patterns, among others.

In some embodiments, the predictive analytics can be used in different areas, such as insurance and/or financial services, which can rely on capturing relationships between explanatory variables and the predicted variables from past occurrences, as well as, exploiting these variables to determine future outcomes. The predictive analytics can be additionally used in insurance industry for sales and marketing purposes, predicting customer behaviors and needs, anticipating customer reactions to promotions, and reducing acquisition cost (direct email, discount program, etc.).

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes systems and methods for assessing insurance needs using predictive modeling techniques. In some embodiments, the system employs basic customer information and additional customer information to generate a basic profile for the customer. The system then analyzes the basic profile associated with the customer using predictive modeling techniques to generate estimated customer information. The system then pre-populates one or more fields of the full profile associated with the customer based on said estimated customer information. The system then analyzes the full profile associated with the customer to generate one or more insurance products for the customer including the insurance reallocation recommendations to meet the insurance needs of the customer and fulfill one or more proposed future goals.

The term predictive modeling technique as used herein includes any rules or techniques using statistical approaches for using a computer to determine a probable or most likely one of a set of possible outputs or values, based on input data. The Predictive modeling techniques are typically created by applying algorithms to sets of data having known results, identified as training data, and then testing resulting predictive modeling techniques against a set of similar data. The predictive modeling techniques can be understood as heuristic techniques for creating a statistical model of customer behavior based on input data. Examples of predictive models include K-Nearest-neighbor Algorithms, non-negative matrix factorization, rotation forest, random forest technique, Naïve Bayesian Models, Bayesian Network Models, Support Vector Machines, hybrid collaborative filtering algorithm approaches, and the like.

System Architecture

FIG. 1 is a block diagram illustrating a system architecture of an insurance needs system, according to an embodiment. In FIG. 1, insurance needs system 100 includes components such as internal database 102, external database 104, profile analytics engine 106, insurance needs engine 108, user interface 110, client computing devices 112, 114, and 116, and communication networks 118, 120, and 122. Insurance needs system 100 additionally includes one or more servers (not shown in FIG. 1) having the necessary hardware and software/firmware to implement any of the aforementioned system components that require implementation via such necessary hardware and software/firmware, among others. It should be understood that insurance needs system 100 can include less components, more components, or different components depending on the desired analysis goals.

In FIG. 1, internal database 102 is coupled to and in bidirectional communication with profile analytics engine 106 and insurance needs engine 108 through communication network 120. External database 104 is coupled to and in bidirectional communication with profile analytics engine 106 through communication network 118. Profile analytics engine 106 and insurance needs engine 108 are each coupled to and in bidirectional communication with user interface 110 through communication network 122. User interface 110 is coupled to and in bidirectional communication with one or more client computing devices 112, 114, and 116.

In some embodiments, internal database 102 is implemented as a set of computer instruction executed by central processing units that run computer executable program instructions or related algorithms on a server, configured as a relational database and designed to fetch, index and store customer data, and provide said stored customer data to authenticated requesters. In these embodiments, internal database 102 is configured to receive and store basic profiles and full profiles provided from profile analytics engine 106, and to receive and store insurance product information associated with one or more insurance products and provided by insurance needs engine 108. Further to these embodiments, internal database 102 is configured to receive requests for basic profiles and full profiles from profile analytics engine 106, and to provide said stored basic profiles and full profiles to profile analytics engine 106. In these embodiments, internal database 102 is further configured to receive requests for information regarding insurance products from insurance needs engine 108 and to provide said stored insurance product information to insurance needs engine 108. In other embodiments, internal database 102 includes an initial set of previously generated personas, such as, for example personas obtained from a third-party (e.g., purchased from a third-party persona vendor). In these embodiments, internal database 102 is configured to receive requests for the initial set of previously generated personas from profile analytics engine 106, and to provide said stored initial set of previously generated personas to profile analytics engine 106 when requested.

In some embodiments, code implementing internal database 102 can be housed locally or remotely, for instance, in a secure, scalable facility. In other embodiments, for security and reliability, redundancy may be employed to protect the data stored within internal database 102. In an example, internal database 102 is configured as a database implementing MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that organize collections of data.

In some embodiments, external database 104 is implemented as a set of computer instructions executed by central processing units that run computer executable program instructions or related algorithms on a server, configured as a relational database and designed to provide additional customer information derived from ties formed between individuals and/or organizations using, for example, the Internet. Example of external databases 104 include the World Wide Web, external social networks, external consulting firms, third party providers, external project sources and the like. In these embodiments, external database 104 provides additional customer information, as well as other stored customer data and/or customer files to one or more software modules operating within insurance needs engine 108.

In some embodiments, profile analytics engine 106 is a collection of one or more software modules configured to:
  receive basic customer information, additional customer information, and store customer data and/or customer files;
  generate a basic profile associated with the customer based on said basic customer information, additional customer information, and stored costumer data and/or customer files;
  generate estimated customer information based on said basic profile; and
  generate a full profile associated with the customer based on said basic profile and said estimated customer information.

In these embodiments, profile analytics engine 106 receives basic customer information from one or more user interfaces 110 associated with one or more client computing devices 112, 114, and 116; receives additional customer information from external databases 104, and generates a basic profile for the customer based on the received basic customer information and additional customer information. Further to these embodiments, additional customer information can be generated by profile analytics engine 106 based on unstructured data received from external databases 104. Examples of unstructured data include text, images, social networking relationships, financial statements, insurance information, demographic information, health information and the like. In these embodiments, profile analytics engine 106 stores the generated basic profile at internal database 102. In some embodiments, a basic profile includes one or more attributes associated with a customer, such as, for example: age, gender, ethnicity, place of residence, marital status, number and identity of dependent persons (e.g., children and dependent adults), expenditures, savings, approximate market value of assets and their composition, education, professional status, future goals (e.g., new house, new car, investments, new additions to the family, education, etc.), and the like. The insurance needs of the customer can be directed towards determining one or more insurance products such as, for example, health insurance, whole life insurance, term life insurance, universal life insurance, variable universal life (VUL), disability income insurance, annuities, long term care, and the like.

In other embodiments, profile analytics engine 106 receives a basic profile associated with a customer from internal database 102. In these embodiments, profile analytics engine 106 additionally receives a plurality of personas from internal database 102 where said personas includes an initial set of previously generated personas, as well as, non-personally identifiable information derived from the full profile of customers stored within internal database 102. Further to these embodiments, profile analytics engine 106 generates estimated customer information using predictive modeling techniques and employing the personas as training data. Examples of predictive modeling techniques include K-Nearest-neighbor Algorithms, non-negative matrix factorization, rotation forest, random forest technique, Naïve Bayesian Models, Bayesian Network Models, Support Vector Machines, hybrid collaborative filtering algorithm approaches, and the like. In these embodiments, profile analytics engine 106 employs the estimated customer information to pre-populate one or more missing fields of the full profile associated with the customer, and stores said full profile at internal database 102. Further to these embodiments, the full profile associated with the customer includes, for example, demographic data, health historical data, financial data, insurance information, activities information, future goals, and the like. In some embodiments, the greater the number of attributes the user provides within the basic customer information to generate the basic profile of the customer, the more accurately the system can determine the estimated customer information included within a full profile associated with the customer. Profile analytics engine 106 will be further detailed in FIG. 3, below.

In some embodiments, insurance needs engine 108 is a collection of one or more software modules configured to receive a full profile associated with a customer from internal database 102, additionally receive insurance-needs data from client computing devices 112, 114, and 116 and/or database 102, determine one or more insurance products associated with the customer based on said full profile and said insurance-needs data, and provide said insurance product(s) to internal database 102 and/or user interface 110. In these embodiments, insurance needs engine 108 receives the full profile associated with a customer from internal database 102 and generates one or more insurance products based on said full profile. In other embodiments, insurance needs engine 108 additionally receives insurance-needs data from users interacting with client computing devices 112, 114, and 116 via user interface 110 and generates one or more insurance product for the customer based on the received full profile and the received insurance-needs data. In some embodiments, the insurance product information provides customer instructions directed towards prioritizing the establishment of one or more insurance products, ensuring financial security with proper insurance product(s) allowing the customer to protect and guarantee his/her welfare, as well as fulfilling one or more proposed future goals (e.g., new house, new car, investments, new additions to the family, education), among others. In these embodiments, the insurance product information includes a recommendation of one or more insurance product(s) that meets the customer needs. Examples of insurance products include health insurance, whole life insurance, term life insurance, universal life insurance, variable universal life (VUL), disability income insurance, annuities, long term care, and the like.

In some embodiments, insurance needs engine 108 provides the insurance product information to internal database 102 for storage. In other embodiments, insurance needs engine 108 provides the insurance product information to user interface 110 for displaying to the user. Insurance needs engine 108 will be further detailed in FIG. 4, below.

In some embodiments, each software module within profile analytics engine 106 and insurance needs engine 108 is implemented as a code running on a processing unit configured for running related algorithms or computer executable program instructions that are executed by a server, a single computer, or multiple computers within a distributed configuration. In these embodiments, the processing unit is configured to interact with one or more software modules of the same or different types operating within one or more of profile analytics engine 106 and/or insurance needs engine 108. Further to these embodiments, each processing unit includes a processor with computer-readable medium, such as, for example, a random access memory (RAM), coupled to the processor. Examples of processor types include a microprocessor, an application specific integrated circuit (ASIC), and a field programmable object array (FPOA), among others. Examples of firmware and/or hardware and associated software enabling functionality of the aforementioned system components will be further described in FIG. 2, below.

In FIG. 1, user interface 110 is configured to interact with one or more users to receive basic customer information and/or insurance-needs data, and to distribute said basic customer information and/or insurance-needs data to other components within insurance needs system 100. In some embodiments, user interface 110 is additionally configured to receive the full profile associated with a customer from profile analytics engine 106, and/or receive one or more insurance products associated with the customer from insurance needs engine 108, and display said full profile and/or insurance product(s) to one or more users. In these embodiments, user interface 110 is configured to receive basic customer information and insurance-needs data from one or more users via client computing devices 112,114, and 116, to provide said basic customer information to profile analytics engine 106, and to provide said insurance-needs data to insurance needs engine 108. Further to these embodiments, user interface 110 is configured to receive a full profile associated with a customer from profile analytics engine 106 via communication network 122 and display said full profile to one or more users via client computing devices 112, 114, and 116. In some embodiments, users interacting with user interface 110 can then validate the estimated customer information predicted by profile analytics engine 106. In these embodiments, user interface 110 is configured to receive supplemental customer information from said users and provide said supplemental customer information to profile analytics engine 106. In other embodiments, user interface 110 is configured to receive the insurance product (s) associated with a customer from insurance needs engine 108 via communication network 122 and display said insurance product(s) to one or more users via client computing devices 112, 114, and 116. In these embodiments, user interface 110 is configured to receive insurance-needs data from one or more users and provide said insurance product (s) data to insurance needs engine 108. In an example, users interacting with client computing devices 112, 114, and 116 include financial agents, insurance agents, customers, and the like.

In other embodiments, user interface 110 is configured to allow a user to create an account associated with a customer. In these embodiments, the user interacts with user interface 110 that is running on client computing devices 112, 114, and 116 via an input device, such as, for example a touch screen, a mouse, a keyboard and/or a keypad working in concert with a display, and the like. In an example, the user can be a financial agent, insurance agent, or a customer who wants to obtain information for one or more insurance products that best fit the customer needs. In this example, the user interacts with user interface 110 to provide basic customer information including one or more attributes, such as, for example: gender, age, marital status, number of children/dependents, profession, owning an insurance product/retirement plan, and the like. Further to this example, the customer can additionally establish a plurality of future goals, such as, for example: "retire within the next 3 year."

In some embodiments, user interface 110 is implemented as a set of computer instructions executed on client computing devices 112, 114, and 116 by central processing units that run computer executable program instructions or related algorithms. In some embodiments, user interface 110 can be implemented as a browser or an application running on client computing devices 112, 114, and 116.

In some embodiments, client computing devices 112, 114, and 116 include a set of software instructions in combination with hardware equipment or firmware to allow users to interact with various components of profile analytics engine 106 and insurance needs engine 108. Examples of client computing devices 112, 114, and 116 include a smartphone, a desktop computer, a laptop computer, a tablet, a PDA and/or any other type of processor-controlled device that can receive, process and/or transmit digital data.

In some embodiments, communication networks 118, 120, and 122 are implemented as one or more networks connecting the different components within insurance needs system 100 and allowing said components to interact with one another. Communication networks 118, 120, and 122 include hardware and associated software/firmware for allowing communication between one or more components of insurance needs system 100. Examples of communication networks 118, 120, and 122 include intranets, local area networks (LANs), the cloud, virtual private networks (VPNs), wide area networks (WANs) and the internet, among others.

In operation, a user creates a new account for a customer and provides basic customer information by interacting with user interface 110 running on client computing devices 112, 114, and 116 and coupled to profile analytics engine 106 via communication network 122. Profile analytics engine 106 receives and processes said basic customer information, and receives additional customer information from one or more external databases 104. Profile analytics engine 106 generates a basic profile for the customer based on the basic customer information and the additional customer information. Profile analytics engine 106 then stores said basic profile at internal database 102. Profile analytics engine 106 then analyzes the basic profile associated with the customer to generate estimated customer information using predictive modeling techniques. Profile analytics engine 106 then employs said estimated customer information to pre-populate one or more fields of the full profile associated with the customer. Profile analytics engine 106 then displays said full profile to the user and the user can then validate the estimated customer information and provides supplemental customer information to refine/modify one or more fields of the pre-populated full profile associated with the customer, if desired. Insurance needs engine 108 then employs the full profile associated with the customer to identify the insurance needs of the customer and generate one or more insurance products that best fit the customer needs and future goals of the customer. Insurance needs engine 108 then displays said insurance product(s) to the user via user interface 110. The user can then provide additional insurance-needs data to insurance needs engine 108 via user interface 110. When a user provides additional insurance-needs data, insurance needs engine 108 modifies the insurance product(s) information based on the additional insurance-needs data. In some embodiments, insurance needs engine 108 can generate one or more insurance product(s) based on the provided insurance-needs data and/or the additional insurance-needs data (if available), and the full profile associated with the customer.

Figure 2:
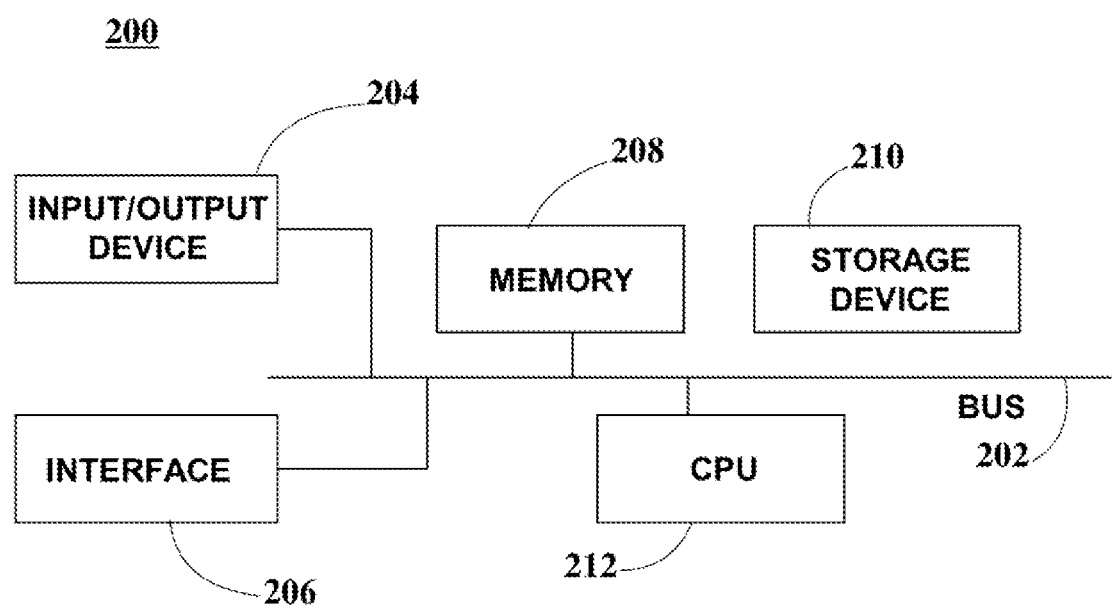
FIG. 2 is a block diagram illustrating an example computing device or server in which one or more embodiments of the present disclosure may operate, according to an embodiment.

FIG. 2 is a block diagram illustrating an exemplary computing device or server in which one or more embodiments of the present disclosure may operate, according to an embodiment. In FIG. 2 computing device 200 includes example components of client computing devices that may operate within insurance needs system 100 of FIG. 1, execute modules described in FIGS. 3 and 4, or execute code implementing concepts/ideas contained in FIGS. 5 and 6, according to an exemplary embodiment. In one embodiment, computing device 200 includes bus 202, input/output (I/O) device 204, communication interface 206, memory 208, storage device 210 and central processing unit 212 (CPU). In some embodiments, computing device 200 includes additional, fewer, different, or differently arranged components than those illustrated in FIG. 2.

In FIG. 2, bus 202 is in physical communication with I/O device 204, communication interface 206, memory 208, storage device 210 and central processing unit 212. In some embodiments, bus 202 includes a path that permits components within computing device 200 to communicate with each other. Examples of I/O device 204 include any peripheral and/or other mechanisms that enable a user to input information to computing device 200, such as, for example, a keyboard, a computer mouse, a track ball, other input buttons, touch screens, voice recognition devices, biometric mechanisms and the like. In these embodiments, (I/O) device 204 additionally includes a mechanism that outputs information to the user of computing device 200, such as, for example, a display, a light emitting diode (LED), a printer, a speaker and the like.

In FIG. 2, communication interface 206 is a device that enables computing device 200 to communicate with other computing devices and/or systems through communication networks (not shown in FIG. 2), such as, for example, Wi-Fi cards, Ethernet and the like. In some embodiments, communication networks refer to any communication network between computers that allows computing device 200 to exchange data, such as, for example, intranets, local area networks (LANs), virtual private networks (VPNs), wide area networks (WANs), the internet and the like. Memory 208 is a device that stores software programs or data used in computing device 200, such as, for example, a random access memory (RAM), a read-only memory (ROM), a flash memory and the like. In FIG. 2, storage device 210 is a device that stores and retrieves information, such as, for example, magnetic and/or optical recording medium, Ferroelectric RAM (F-RAM) hard disks, solid-state drives, floppy disks, optical discs and the like. In one embodiment, memory 208 and storage device 210 store information and instructions for execution by one or more central processing units 212. Examples of central processing units 212 include a microprocessor, an application specific integrated circuit (ASIC), a field programmable object array (FPOA) and the like. In this embodiment, central processing unit 212 interprets and executes instructions retrieved from memory 208 and storage device 210.

In some embodiments, computing device 200 can be implemented as part of a server, client computing devices and the like. Examples of implementations of computing device 200 include servers, authorized client computing devices 112, 114, and 116, smartphones, desktop computers, laptop computers, tablet computers, PDAs and other types of processor-controlled devices that can receive, process, and/or transmit digital data. In an example, computing device 200 performs certain operations that are required for the proper operation of insurance needs system 100. Computing devices 200 perform these operations because of central processing unit 212 executing software instructions contained within a computer-readable medium, such as within memory 208.

In one embodiment, the software instructions of the system are read into memory 208 from another memory location, such as from storage device 210, or from another computing device (e.g., client computing devices 112, 114, and 116) via communication interface 206. In this embodiment, the software instructions contained within memory 208 instructs central processing unit 212 to perform processes that will be further described in FIGS. 3-6, below. Alternatively, hardwired circuitry may be used in place of or in combination with software instructions to implement the processes described herein. Thus, implementations described herein are not limited to any specific combinations of hardware circuitry and software.

Figure 3:
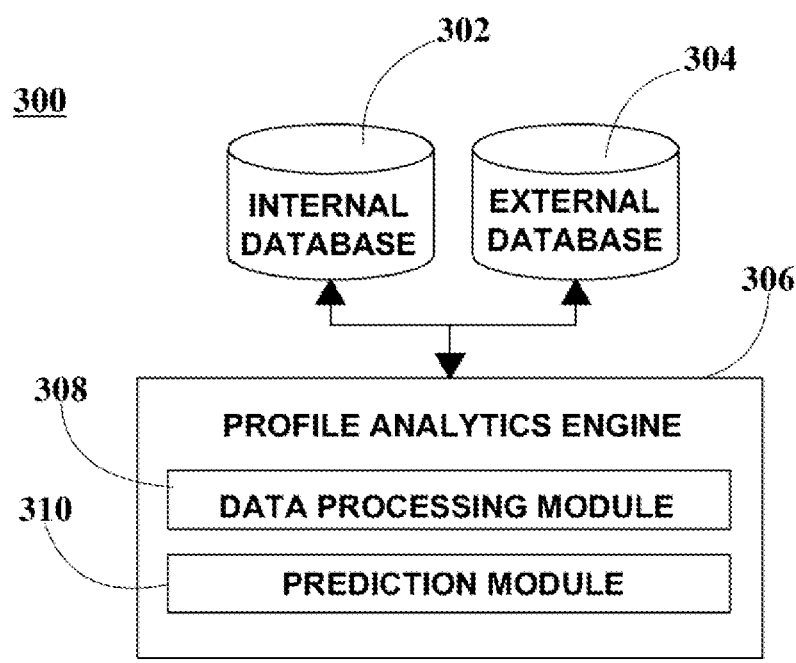
FIG. 3 is a block diagram illustrating a sub-system of the insurance needs system of FIG. 1 pertaining to a profile analytics engine, according to an embodiment.

FIG. 3 is a block diagram illustrating a sub-system of the insurance needs system of FIG. 1 pertaining to a profile analytics engine, according to an embodiment. In FIG. 3, sub-system 300 includes internal database 302, external database 304, and profile analytics engine 306. Profile analytics engine 306 further includes data processing module 308 and prediction module 310. It should be understood that sub-system 300 can include fewer components, more components, or different components depending on the desired analysis goals and that the components may be arranged differently than illustrated in sub-system 300 of FIG. 3.

In FIG. 3, profile analytics engine 306 is operatively coupled to and in bidirectional communication with internal database 302 and external database 304 through communication networks (not shown in FIG. 3). In an example and referring to FIG. 1, profile analytics engine 306 functions in a substantially similar manner to profile analytics engine 106 within insurance needs system 100. Continuing the example, internal database 302 and external database 304 function in a substantially similar manner to internal database 102 and external database 104, respectively, within insurance needs system 100.

Figure 5:
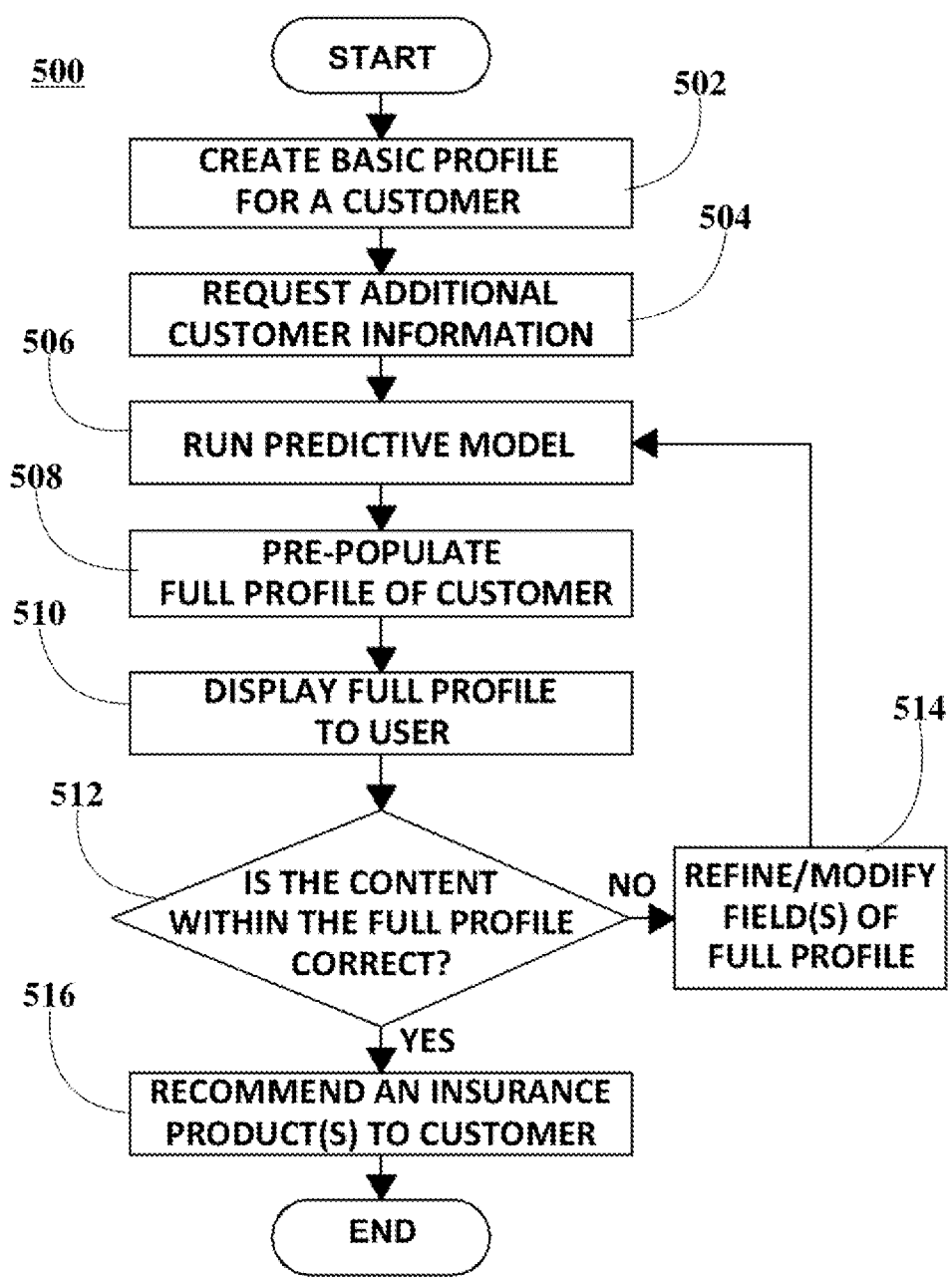
FIG. 5 is a flow diagram describing a method for assessing insurance needs using predictive analytics, according to an embodiment.
Figure 6:
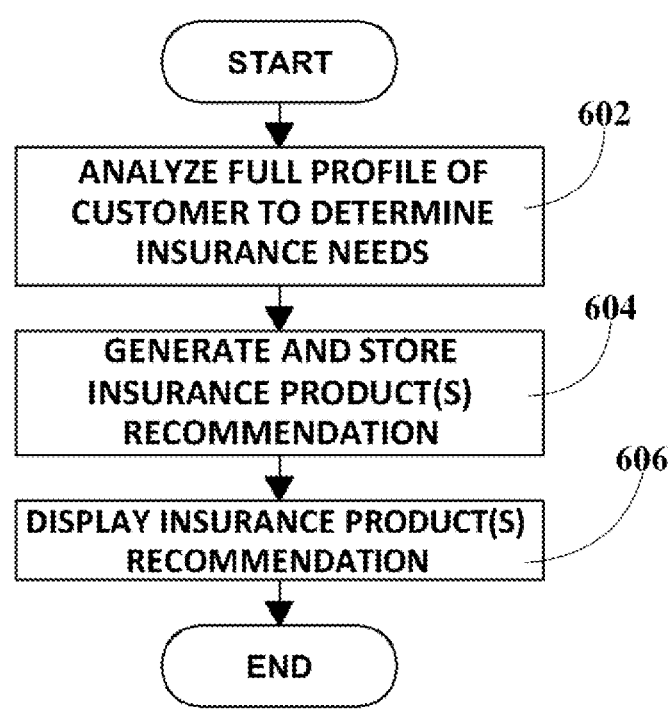
FIG. 6 is a flow diagram describing a method for recommending an insurance product for a customer, according to an embodiment.

In some embodiments, each software module within profile analytics engine 306 includes a separate processing unit for running algorithms or computer-executable program instructions related to the operation of the methods described in FIGS. 5 and 6. The processing unit includes a processor with computer-readable media, such as, for example, a random access memory (RAM) (not shown in FIG. 3), coupled to the processor. Examples of processor types include a microprocessor, an application specific integrated circuit (ASIC), and a field programmable object array (FPOA), among others.

In some embodiments, profile analytics engine 306 is configured to generate one or more fields of the pre-populated full profile associated with the customer based on basic customer information, additional customer information, and estimated customer information; provide the generated full profile to a user interface for displaying to a user associated with the customer; receive supplemental customer information from the user via the user interface; and to validate and/or refine/modify one or more fields of the full profile associated with the customer based on the supplemental customer information. Estimated customer information is customer information not provided by the customer or readily available from external databases and derived by determining the financial behavior of the customer and other customer attributes using predictive modeling techniques. Further to these embodiments, refining one or more fields of the pre-populated full profile includes modifying one or more fields with the supplemental customer information. In other embodiments, refining one or more fields of the pre-populated full profile includes modifying one or more fields with the supplemental customer information, as well as, modifying one or more fields with updated estimated customer information. In these embodiments, updated estimated customer information is estimated customer information that has been modified based on updated basic, additional, and/or supplemental customer information and using predictive modeling techniques.

In some embodiments, data processing module 308 is a software module configured to receive and process basic customer information and additional customer information and generate a basic profile associated with the customer based on said basic customer information and additional customer information. In these embodiments, a user creates an account associated with a customer using profile analytics engine 306 and provides basic customer information by interacting with a user interface, running on a client computing device and coupled to profile analytics engine 306. Further to these embodiments, data processing module 308 receives and processes said basic customer information, receives additional customer information from one or more external databases 304, and generates a basic profile for the customer based on said basic customer information and said additional customer information. In these embodiments, data processing module 308 is additionally configured to receive unstructured data from external databases 304 and processes said unstructured data into additional customer information, and/or receive supplemental customer information from a user interacting with the user interface running on the client computing device. In these embodiments, data processing module 308 stores said basic profile at internal database 302. In other embodiments, data processing module 308 receives requests for basic profiles from prediction module 310 and provides said basic profiles to prediction module 310.

In an example, a user is a financial agent, insurance agent, or a customer who wants to obtain the insurance product(s) that best fit the customer's needs. In this example, the user interacts with the user interface, running on a client computing device and coupled to profile analytics engine 306 to provide basic customer information. In this example, data processing module 308 employs said basic customer information provided by the user to request additional customer information from one or more external databases 304, and then generates the basic profile associated with the user.

In some embodiments, prediction module 310 is a software module including predictive models and is configured to receive the basic profile associated with a customer, generate estimated customer information based on the basic profile associated with the customer, and additionally generate a full profile associated with the customer based on said basic profile and said estimated customer information. In these embodiments, prediction module 310 receives the basic profile associated with the customer from internal database 302 or from data processing module 308. Further to these embodiments, data processing module 308 additionally receives a plurality of personas from internal database 302 where said personas include an initial set of previously generated personas, as well as, non-personally identifiable information derived from the full profile of customers stored within internal database 302. In these embodiments, data processing module 308 analyzes said basic profile by applying a predictive modeling technique employing said personas as training data to generate estimated customer information. Further to these embodiments, prediction module 310 analyzes said basic profile by applying a predictive modeling technique employing the personas as training data to determine which specific personas most closely match said basic profile. In another embodiment, prediction module 310 analyzes said basic profile by applying a predictive modeling technique employing the personas as training data to determine which portions of a plurality of personas most closely match associated portions of said basic profile. Examples of predictive modeling techniques include K-nearest-neighbor algorithms, non-negative matrix factorization, rotation forest, random forest technique, naïve Bayesian models, Bayesian network models, support vector machines, hybrid collaborative filtering algorithm approaches, and the like. In some embodiments, the greater the number of attributes the user provides to said basic customer information that is employed by data processing module 308 to generate the basic profile of the customer, the more accurately the system can determine said estimated customer information that is included within the full profile associated with the customer.

In some embodiments, prediction module 310 is configured to determine and apply the predictive modeling technique that can more accurately generate said estimated customer information based on the attribute type and number of attributes included within the basic profile of the customer. In other embodiments, prediction module 310 is further configured to prioritize the attributes within basic customer information that profile analytics engine 306 requests from the user, and/or to assign optimal weights to each attribute or variable included within the basic profile of the customer for the prediction process, if desired. In these embodiments, prediction module 310 assigns said weights based on the type of attributes within the customer information included in the basic profile of the customer, as well as, on the predictive modeling technique being applied to generate said estimated customer information. In this way, higher-prioritized attributes can be weighted more heavily when determining a user's insurance needs.

In other embodiments, prediction module 310 employs the estimated customer information to pre-populate one or more missing fields of the full profile associated with the customer, and then stores said full profile at internal database 302.

In an example, prediction module 310 is able to identify one or more personas that best match a 42-year-old married male individual from California, employing K-nearest-neighbor algorithms. In this example, prediction module 310 employs conditional probability distributions and the value of the attributes or variables associated with the K-nearest-neighbors or K closest personas to the customer, to generate estimated customer information, and then pre-populate one or more missing fields of the full profile associated with the customer. Further to this example, the user validates one or more fields of the full profile associated with the customer, and provides supplemental customer information to refine/modify one or more fields of the full profile associated with the customer. In this example, prediction module 310 employs the validated/modified fields to more accurately determine the remaining missing fields of the full profile associated with the customer.

In some embodiments, prediction module 310 is further configured to evaluate the predictive modeling technique being applied to generate said estimated customer information. Examples of techniques employed to evaluate the performance of the predictive models include mean squared error, root mean squared error, median absolute deviation, receiver operating characteristic (ROC) curve, ROC area under the curve (AUC) statistic, confusion matrix, lift scores, precision and recall techniques and the like. For example, a computer can be configured to evaluate a performance of the predictive model based at least in part on the user modifying the full profile via the computer 112 after the application of the model and to take a corrective action accordingly, such as via adjusting or modifying at least one of an input to the model, the persona, the model, the application of the model, or any other characteristic or aspect, such as via preset algorithms or heuristics or artificial intelligence algorithms. In these embodiments, the performance evaluation of the predictive modeling techniques provides insights as to the accuracy of each predictive modeling technique given a set of known basic customer attributes included within the basic profile of the customer. Further to these embodiments, said insights enable prediction module 310 to select and apply the predictive modeling technique that can most accurately generate estimated customer information based on the set of known basic customer attributes included within the basic profile of the customer. In these embodiments, the performance evaluation of the predictive modeling techniques additionally provides insights that can enable prediction module 310 to prioritize the attributes included within the basic customer information that profile analytics engine 306 requests from the user and/or assigns optimal weights to each attribute or variable included within the basic profile of the customer for the prediction process, if desired. In these embodiments prediction module 310 selects and applies a performance evaluation technique based on the amount and type of known basic customer information included within the basic profile associated with the customer and the predictive modeling technique being applied to generate the estimated customer information.

In an example, to evaluate the predictive modeling techniques, prediction module 310 determines that there is a set of 150 basic attributes known about a customer based on the basic profile of the customer. Continuing the example, prediction module 310 analyzes 130 basic attributes from the 150 basic attributes known about the customer, employing nearest-neighbor algorithms. Based on said analysis, prediction module 310 then generates estimated customer information including those 20 basic attributes known about the customer, which have not been taken into consideration in the prediction process. In this example, prediction module 310 evaluates the performance of the predictive modeling technique by calculating the difference between the true values of these 20 known basic customer attributes and the values determined by prediction module 310 for those same 20 basic customer attributes. The performance evaluation of the nearest-neighbor algorithm provides insights about how accurately the nearest-neighbor algorithm performed given the set of 150 known basic customer attributes.

In operation, a user creates a new account for a customer and provides basic customer information by interacting with a user interface running on a client computing device and coupled to profile analytics engine 306. Data processing module 308 operating within profile analytics engine 306 receives and processes said basic customer information, receives and processes additional customer information from one or more external databases 304, and generates a basic profile for the customer based on said basic customer information and said additional customer information. Data processing module 308 then stores said basic profile at internal database 302. Prediction module 310 operating within profile analytics engine 306 requests and receives the basic profile associated with the customer from internal database 302 or from data processing module 308. Prediction module 310 additionally receives a plurality of personas from internal database 302. Prediction module 310 then analyses said basic profile by applying predictive modeling techniques, employing said personas as training data to generate estimated customer information. Prediction module 310 then pre-populates the one or more missing fields of the full profile associated with the customer employing said estimated customer information. Prediction module 310 then stores said full profile at internal database 302 and profile analytics engine 306 then displays said full profile to the user via client computing devices. The user can then validate the determined customer information included within said full profile and provide supplemental customer information to data processing module 308 to refine/modify one or more fields of the full profile associated with the customer, if desired. Prediction module 310 then evaluates the performance of the predictive modeling technique applied to generate the estimated customer information.

Figure 4:
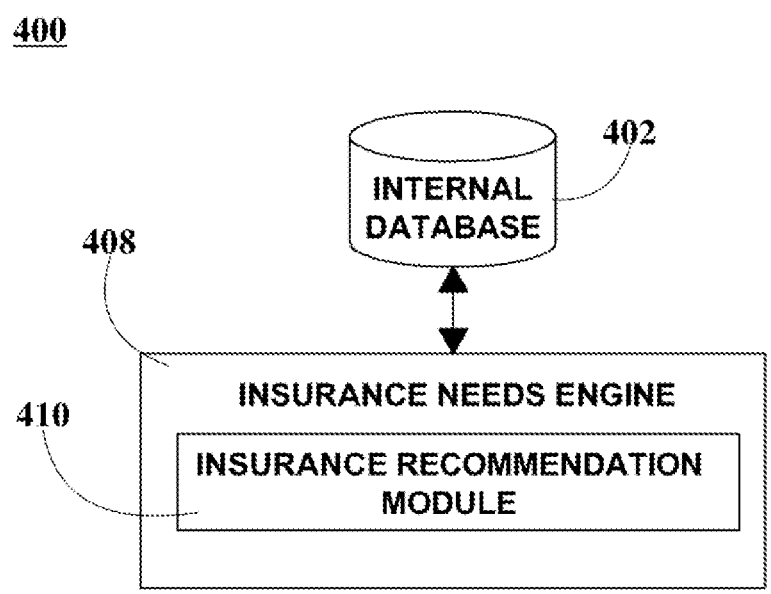
FIG. 4 is a block diagram illustrating another sub-system of the insurance needs system of FIG. 1 pertaining to an insurance needs engine, according to an embodiment.

FIG. 4 is a block diagram illustrating another sub-system of an insurance needs system pertaining to an insurance needs engine, according to an embodiment. In FIG. 4, sub-system 400 includes internal database 402 and insurance needs engine 408. Insurance needs engine 408 further includes insurance recommendation module 410. It should be understood that sub-system 400 can include less components, more components, or different components depending on the desired analysis goals and that the components may be arranged differently than illustrated in sub-system 400 of FIG. 4.

In FIG. 4, insurance needs engine 408 is operatively coupled to and in bidirectional communication with internal database 402 through communication networks (not shown in FIG. 4). In an example and referring to FIG. 1, insurance needs engine 408 functions in a substantially similar manner to insurance needs engine 108 within insurance needs system 100. Continuing the example, internal database 402 functions in a substantially similar manner to internal database 102 within insurance needs system 100 of FIG. 1.

In some embodiments, each software module within insurance needs engine 408 includes a separate processing unit for running algorithms or computer-executable program instructions related to the operation of the methods described in FIGS. 5 and 6. The processing unit includes a processor with computer-readable medium, such as, for example a random access memory (RAM) coupled to the processor (not shown in FIG. 4). Examples of processor types include a microprocessor, an application specific integrated circuit (ASIC), and a field programmable object array (FPOA), among others.

In some embodiments, insurance needs engine 408 is configured to generate one or more insurance products for recommendation to a customer based on a full profile associated with the customer, to provide said insurance product recommendation to a user interface for displaying to a user associated with the customer, receive additional insurance-needs data from the user via the user interface, and to modify and to provide to said customer the insurance product recommendation associated with the customer based on the received insurance-needs data and/or additional insurance-needs data, and the full profile associated with the customer.

In some embodiments, insurance recommendation module 410 is a software module including insurance/financial tools, data mining and other data processing, configured to receive the full profile associated with a customer from internal database 402, generate one or more recommended insurance products for the customer based on said full profile, and provide said insurance-product recommendation to internal database 402 and/or one or more users. In these embodiments, insurance recommendation module 410 receives the full profile associated with the customer from internal database 402 and analyzes said full profile employing financial/insurance tools (e.g., risk and/or underwriting analysis), data mining and other data processing to identify the insurance needs for the customer based on the current financial situation of the customer, demographic information, health information, and one or more proposed future goals of the customer. In these embodiments, based on said insurance needs, insurance recommendation module 410 generates one or more prioritized insurance product recommendations to build financial security that enable the customer to protect his/her welfare, as well as fulfilling one or more proposed future goals (e.g., new house, new car, investments, new additions to the family, education), among others. In other embodiments, insurance recommendation module 410 generates the insurance-product recommendation based on the full profile of the customer, insurance-needs data provided by insurance needs engine 408, and the additional insurance-needs data provided by the user. In some embodiments, insurance recommendation module 410 stores the insurance product recommendation at internal database 402.

In some embodiments, insurance recommendation module 410 receives additional insurance-needs data from a user associated with the customer to modify the insurance-products recommendation previously identified by insurance recommendation module 410. In these embodiments, insurance recommendation module 410 processes said additional insurance-needs data and then generates the insurance product recommendation for the customer based on the full profile associated with the customer and said additional insurance-needs data provided by the user.

In some embodiments, insurance needs engine 408 displays the insurance-product recommendation to the one or more users interacting with a user interface running on a client computing device and coupled to insurance needs engine 408. In these embodiments, the insurance-product recommendation information includes instructions directed towards implementing a proper insurance plan/product for the customer while accomplishing one or more future goals (e.g., new house, new car, investments, new additions to the family, education), among others. In an example, an individual wishes to get married and have a child within the next year. Continuing this example, insurance recommendation module 410 analyzes the full profile associated with the customer, identifies the insurance needs of the customer and recommends an insurance product that can allow a customer to protect the welfare and future goals of his/her person and/or family.

In operation, insurance recommendation module 410 operating within insurance needs engine 408 requests and receives the full profile associated with a customer from internal database 402. Insurance recommendation module 410 then analyzes said full profile to identify one or more insurance needs of the customer employing financial/insurance tools, data mining and other data processing. Insurance recommendation module 410 then generates the insurance product recommendation that best fits the customer needs based on said insurance needs information. Insurance recommendation module 410 then stores said insurance-product recommendation at internal database 402 and insurance needs engine 408 displays said insurance-product recommendation to the user via client computing devices. The user can then provide additional insurance-needs data to insurance recommendation module 410 to refine/modify the insurance-product recommendation of the customer. In an example, insurance recommendation module 410 operating within insurance needs engine 408 can recommend an insurance product to a customer based on attributes, such as, for example gender, marital status, children/dependents, geographic location, financial records, etc. In this example, a full profile is generated based on the provided attributes and the full profile is passed to insurance recommendation module 410, insurance recommendation module 410 then analyzes the full profile associated with the customer to identify the insurance needs and recommend an insurance product that best fits the needs of the individual, as well as, his/her future goals. In some embodiments, insurance recommendation module 410 can generate a modified insurance product recommendation based on the provided additional insurance-needs data from the customer as well as the full profile associated with the customer.

Process Flow Diagrams for Assessing Insurance Needs Using Predictive Modeling Techniques FIG. 5 is a flow diagram describing a method for assessing insurance needs using predictive analytics, according to an embodiment. In FIG. 5, method 500 begins when a profile analytics engine operating within an insurance needs system generates a basic profile for a customer based on basic customer information received from the user and/or additional customer information received from external databases. Further to this embodiment, the profile analytics engine generates estimated customer information based on said basic customer information and said additional customer information using predictive modeling techniques. The profile analytics engine then pre-populates one or more missing fields of the full profile associated with the customer based on said estimated customer information. In this embodiment, an insurance needs engine operating within the insurance needs system, analyzes the full profile associated with the customer to identify the insurance needs of the customer and then generates an insurance product(s) for the customer.

In FIG. 5, method 500 includes a plurality of steps that can be performed by one or more computing devices, such as, for example computing device 200 described in FIG. 2, implementing/running one or more modules/processes of the exemplary operating environments of FIGS. 1-4. The steps of method 500 are embodied in a computer-readable medium containing computer-readable code such that the steps are implemented when the computer-readable code is executed by a computing device. In some implementations, certain steps of method 500 can be combined, performed simultaneously, or in a different order, without deviating from the objective of method 500.

At step 502, a profile analytics engine within the insurance needs system generates a basic profile for a customer. In some embodiments, a user interacts with a user interface running on a client computing device and coupled to a profile analytics engine to create a customer account and provide basic customer information. In these embodiments, a data processing module operating within the profile analytics engine receives and processes said basic customer information and generates a basic profile associated with the customer, which the data processing module then stores at an internal database. In an example and referring to FIGS. 1 and 3, a user creates a customer account and provides basic customer information, by interacting with the user interface running on one or more the client computing devices and coupled to the profile analytics engine. In this example, the data processing module receives and processes said basic customer information, generates a basic profile for the customer based on the received basic customer information, and stores said basic profile at the internal database.

At step 504, the profile analytics engine requests additional customer information from one or more external databases. In some embodiments, the data processing module employs the basic customer information received from the user at step 502 to request additional customer information from one or more external databases. In these embodiments, the data processing module receives and processes said additional customer information and updates the basic profile associated with the customer stored within the internal database. In other embodiments, the data processing module provides the updated basic profile of the customer to a prediction module for further analysis. In an example and referring to FIGS. 1 and 3, the data processing module sends a request for additional customer information to the external database (e.g., Acxiom of Little Rock, Ark. USA). Said request can include basic customer information in the form of attributes provided by the user, such as, for example, name, age, gender, ethnicity, place of residence, marital status, and others. In this example, the data processing module receives additional customer information from the external database including 200 or more attributes associated with the customer, where the data processing module can employ to update the basic profile of the customer stored at the internal database. At step 506, the profile analytics engine runs a predictive modeling technique to generate estimated customer information. In some embodiments, the estimated customer information is an estimate of the insurance needs of the customer and other customer attributes. In these embodiments, a prediction module operating within the profile analytics engine receives the basic profile associated with the customer from the internal database or from the data processing module. Further to these embodiments, the prediction module additionally receives a plurality of personas from the internal database where said personas includes an initial set of previously generated personas, as well as, non-personally identifiable information derived from the full profile of customers stored within the internal database. In these embodiments, the prediction module analyzes the basic profile associated with the customer by applying a predictive modeling technique employing said personas as training data to generate the estimated customer information. In some embodiments, the prediction module is able to determine and apply the predictive modeling technique that can more accurately determine the estimated customer information based on the type and number of attributes included within the basic customer information received from the user at step 502 and the additional customer information received from the external databases at step 504. In an example, the prediction module receives the basic profile associated with the customer from the internal database or from the data processing module. In this example, the prediction module additionally receives a plurality of personas from the internal database. Continuing this example, the prediction module analyzes the basic profile associated with the customer by applying a predictive modeling technique employing the personas as training data to determine the estimated customer information.

In another example, the prediction module can apply K-nearest-neighbor algorithms (K-NNA) to generate estimated customer information. In this example, the prediction module receives the basic profile associated with the customer from the internal database or from the data processing module. The prediction module additionally receives a plurality of personas from the internal database. Continuing the example, the prediction module trains the K-NNA employing said personas as training data. Further to this example, the prediction module then identifies K-nearest-neighbors, based on a similarity measure computed between each persona and the customer. Examples of similarity measures that the prediction module can employ include the Euclidean distance, Pearson Correlation Coefficient, Manhattan distance, a custom similarity measure, and the like. In this example, the prediction module determines the K-nearest-neighbors of the customer by choosing the K personas that score the lowest on the distance test or the highest on the similitude test depending on the similarity measure employed. The value of K refers to the number of nearest-neighbors or personas that best match the basic profile associated with the customer, where said value of K is a positive integer, typically small, and that can be a user-defined value or a value optimized by the K-NNA based on the training data and on the basic information known about the customer. Continuing this example, the prediction module employs conditional probability distributions to determine the most likely value to populate each missing field within the full profile based on the basic profile associated with the customer and the information regarding the previously identified K-nearest-neighbors or K closest personas to the customer.

Further to the example, the prediction module can generate estimated customer information, employing the K-NNA by applying the Euclidean distance metric for measuring the similarity between the personas and the customer. In this example, the prediction module analyzes the basic profile associated with the customer, and trains the K-NNA employing the personas as training data. The training phase of the K-NNA involves the prediction module generating an n-dimensional feature vector representing each training example or persona and mapping these feature vectors in Euclidean space. The prediction module additionally generates and maps a feature vector representing the basic profile associated with the customer. Continuing the example, the prediction module computes the Euclidean distance between the feature vectors representing the basic profile associated with the customer and the feature vector representing each persona. The prediction module then selects K-nearest-neighbors or K personas whose Euclidean distance is the smallest, where K is a positive integer optimized by the K-NNA. In this example, the prediction module employing K-NNA determines that the best value of K is 10, based on the training data and the basic profile associate with the customer. If the customer is a 40-year-old male from Washington, then the 10 nearest-neighbors of the customer are individuals who can also be male, who can be approximately the same age and can be approximately from the same geographical area. Continuing the example, the prediction module employs conditional probability distributions to determine the most likely value with which to populate each missing field within the full profile associated with the customer based on the basic profile associated with the customer and the information about the previously identified 10 nearest-neighbors or 10 closest personas. In this example, the prediction module determines the missing value for rent in the full profile associated with the customer by computing a conditional probability distribution of the amount of dollars per month spent on rent. The prediction module computes said conditional probability distribution using the values of amount of dollars per month spent on rent by the 10 nearest-neighbors or 10 closest personas to the customer. The prediction module then chooses the value that has the highest probability of occurrence based on the conditional probability distribution previously calculated.

In yet another example, the prediction module applies non-negative matrix factorization to determine the estimated customer information. In this example, the prediction module generates an n×m matrix X, where the elements of said matrix X are the values of the attributes or variables included within the basic profile associated with the customer and the personas stored within the internal database. Matrix X includes missing matrix elements corresponding to the missing fields within the full profile associated with the customer that will be determined. Continuing the example, the prediction module applies matrix decomposition algorithms to matrix X, therefore generating an n×r matrix W and an r×m matrix H, which are two non-negative matrices such that matrix X=WH+U; where U is a residual error and r is a value smaller than the value of n and the value of m. In this example, the value of r is determined by the prediction module. The prediction module selects the number of columns of matrix W and the number of rows of matrix H, so that their product WH will approximate matrix X taking into consideration that a residual error U remains. Further to this example, the prediction module determines the missing values in matrix W and matrix H where said values are selected in order to reduce the value of the residual error U employing optimization algorithms. Optimization algorithms that can be employed to determine the missing values of matrix W and matrix H include Lee and Seung's multiplicative update rule, non-negative least squares, the projected gradient descent methods, the active set method, and the block principal pivoting method, among others. After the missing values in matrix W and matrix H are determined by the prediction module to reduce the value of U, the prediction module then calculates matrix X by computing the product of matrix W and matrix H to obtain the final values of the missing fields within the full profile associated with the customer.

In some embodiments, the greater the number of attributes the user provides within the basic customer information at step 502 to generate the basic profile associated with the customer, the more accurately the system can determine the estimated customer information employing predictive modeling techniques.

At step 508, the profile analytics engine pre-populates one or more fields of the full profile associated with the customer based on the estimated customer information determined at step 506. In some embodiments, the prediction module employs the estimated customer information determined at step 506 to pre-populate one or more missing fields within the full profile associated with the customer and then the prediction module stores the full profile at the internal database. In an example and referring to FIGS. 1 and 3, the prediction module pre-populates one or more missing fields of the full profile associated with the customer based on the estimated customer information, and then stores said full profile at the internal database. Method 500 then advances to step 510.

At step 510, the profile analytics engine displays the full profile to the user for validation purposes. In some embodiments, the user interface, which is running on a client computing device and coupled to the profile analytics engine displays the full profile to the user. In these embodiments, the full profile is associated with the customer and has been pre-populated at step 508 employing estimated customer information obtained at step 506. Further to these embodiments, the user can review the customer information included within the full profile and associated with the customer, to validate and/or refine/modify the accuracy of the estimated customer information predicted at step 506. In an example, the user interface running on the client computing devices and displays the full profile associated with the customer.

At step 512, the validity of the customer information contained within the full profile is determined. In some embodiments, the user validates the customer information included within the full profile associated with the customer and/or determines if supplemental customer information is required to modify one or more customer attributes or variables included within the full profile associated with the customer. In some embodiments, if the user determines that supplemental customer information is required to modify one or more customer attributes or variables included within the full profile associated with the customer, method 500 advances to step 514. In these embodiments, if the user validates the customer information included within the full profile, method 500 advances to step 516.

At step 514, supplemental customer information to refine/modify one or more of the pre-populated fields associated with the full profile is received from the user. In some embodiments, the user interacts with the user interface running on a client computing device and coupled to the profile analytics engine to provide said supplemental customer information. In these embodiments, said supplemental customer information adjusts/modifies one or more fields of the full profile previously pre-populated at step 508. Further to these embodiments, the user can additionally validate one or more fields of the full profile previously pre-populated at step 508. In these embodiments, the data processing module receives and processes the supplemental customer information provided by the user to validate and/or modify one or more pre-populated fields of the full profile associated with the customer, and updates the basic profile associated with the customer stored within the internal database. In an example, the user interacts with the user interface running on one or more of the client computing devices to provide supplemental customer information. In this example, the user additionally validates one or more previously pre-populated fields of the full profile, and the data processing module processes said supplemental customer information and adjusts/modifies one or more pre-populated fields of said full profile. In this example, the data processing module updates the basic profile associated with the customer employing said supplemental customer information and stores the updated basic profile at the internal database. Method 500 then advances to step 506 to re-analyze the basic profile associated with the customer using predictive modeling techniques at least one more time to more accurately determine the remaining missing fields of the full profile associated with the customer.

At step 516, an insurance needs engine operating within an insurance needs system generates an insurance-product recommendation based on the full profile associated with the customer. In some embodiments, an insurance recommendation module operating within the insurance needs engine receives the full profile associated with the customer from the internal database. In these embodiments, the insurance recommendation module analyzes the full profile associated with the customer employing financial/insurance tools (e.g., risk and/or underwriting analysis) data mining and other data processing to identify the insurance needs of the customer and generates an insurance-product recommendation that best fits the customer needs, as well as future goals of the customer. Further to these embodiments, the insurance recommendation module stores the insurance product(s) information at the internal database. In other embodiments, the insurance recommendation module displays the insurance product(s) to one or more users via a client computing device. In an example, the insurance recommendation module receives the full profile associated with the customer from the internal database. In this example, the insurance recommendation module analyzes the full profile associated with the customer employing insurance tools, data mining and other data processing to identify the insurance needs of the customer and generate an insurance-product recommendation that best fit the customer needs, as well as, future goals of the customer. Further to this example, the insurance recommendation module stores the insurance-product recommendation at the internal database. Still further to this example, the insurance recommendation module displays the insurance product(s) to a user via the client computing devices. The process for recommending an insurance product(s) for a customer is further described in FIG. 6, below.

By executing method 500 using the exemplary operating environments described in FIGS. 1-4, big data analytics, predictive models and other insurance tools can be implemented for a more efficient and faster processing of larger data sets. Big data analytics allow insurance institutions or insurance companies to profile customers in a more far-reaching manner than possible with human-intervention data-driven analysis. In this way, efficiencies are created by providing means to reduce the level of data-entry efforts required from the user to generate one or more insurance product for a customer, as compared to conventional processes employing established methodology. These features allow performing large work such as time consuming analysis, data-entry tasks, filling customer profiles and generating insurance products, in a more efficient manner than other approaches including manual work performed by humans. In some embodiments, method 500 can be performed under 30 minutes, 25 minutes, 20 minutes, 15 minutes, 10 minutes, 5 minutes, or 1 minute. Note that other time periods can be included, such as intermediary to any of the foregoing.

FIG. 6 is a flow diagram describing a method for recommending an insurance product for a customer, according to an embodiment. In some embodiments and referring to FIG. 5, method 600 describes the operations performed at step 516 of method 500. In FIG. 6, method 600 begins when an insurance recommendation module operating within an insurance needs engine is called to analyze the full profile associated with a customer that is received from an internal database. In some embodiments, the analysis seeks to identify the insurance needs of the customer and further generate one or more insurance product recommendations that best fit the needs of the customer, as well as, one or more defined future goals.

In FIG. 6, method 600 includes a plurality of steps that can be performed by one or more computing devices, such as, for example, computing device 200 described in FIG. 2 implementing/running one or more modules/processes of the exemplary operating environments of FIGS. 1-4. The steps of method 600 are embodied in one or more computer-readable medium containing computer-readable code such that the steps are implemented when the computer-readable code is executed by a computing device. In some implementations, certain steps of method 600 can be combined, performed simultaneously, or in a different order, without deviating from the objective of method 600.

At step 602, an insurance needs engine within an insurance needs system analyzes the full profile associated with a customer to identify the insurance needs of the customer. In some embodiments, an insurance recommendation module operating within the insurance needs engine receives the full profile associated with a customer from an internal database. In these embodiments, the insurance recommendation module employs insurance tools (e.g., risk and/or underwriting analysis) data mining and other data processing to analyze the full profile associated with the customer, identify the insurance needs of the customer, and determine whether said insurance product(s) could meet the insurance needs of the customer and/or fulfill the future goals of the customer. In an example, the insurance recommendation module operating within the insurance needs engine receives the full profile associated with a customer from the internal database. In this example, the insurance recommendation module employs data mining and other data processing and insurance tools to analyze the full profile of the customer, identify the insurance needs of the customer, and determines whether said insurance product(s) could meet the insurance needs of the customer and/or the future goals of the customer. In another example and referring to FIG. 4, the insurance recommendation module determines which insurance product(s) (e.g., health insurance, whole life insurance, term life insurance, universal life insurance, variable universal life (VUL), disability income insurance, annuities, long term care, and the like) can meet the insurance needs associated with the customer based on the analysis of the full profile.

In yet another example and referring to FIG. 4, insurance recommendation module 410 determines one or more insurance needs that should be considered when generating the insurance product recommendation for the customer. In this example, the insurance needs of the customer can be directed towards identifying a proper insurance plan/product for the customer, maintaining the welfare of the customer and/or family, as well as accomplishing one or more future goals (e.g., retire within the next 3 years), among others. In an example, the insurance recommendation module 410 can determine and recommend to a customer an insurance product based on the full profile that can include attributes, such as, for example married, 3 children, 34 years old, civil engineer, living in Arizona, as well as, proposed future goals, such as, for example, invest in a own business, save for retirement, move to another city/state, get a house/car, etc.

At step 604, the insurance needs engine generates and stores an insurance-product recommendation for the customer. In some embodiments, the insurance recommendation module generates an insurance-product recommendation for the customer based on the insurance needs identified at step 604, and stores said insurance-product recommendation at the internal database. In an example, the insurance recommendation module generates an insurance product recommendation for the customer based on the insurance needs identified at step 602. In this example, said insurance needs can be directed towards acquiring one or more insurance products, such as, for example health insurance, whole life insurance, term life insurance, universal life insurance, variable universal life (VUL), disability income insurance, annuities, long term care, and the like. Continuing the example, said insurance product recommendation provides customers with insurance products that allow the customers to fulfill one or more proposed future goals. In another example and referring to FIGS. 1 and 4, the insurance product recommendation includes the insurance product(s) which allow a customer to reduce risk and increase protection based on the associated full profile of the customer, provide cost effective protection based on the associated full profile of the customer, as well as provide benefits information associated with the insurance products contained within the insurance product recommendation.

In an example, said insurance-product recommendation allows a customer to reduce his/her risk, thus enabling the customer to cover any unexpected future events, such as, death, illness, and disability. In this example, insurance recommendation module 410 stores the insurance-product recommendation of the customer at the internal database.

At step 606, the insurance needs engine displays the insurance-product recommendation to one or more users. In some embodiments, the user interface running on a client computing device and coupled to the insurance needs engine displays the previously generated insurance-product recommendation to one or more users. In an example, the user interface running on the client computing devices and coupled to the insurance needs engine displays the insurance-product recommendation previously generated at step 604 to one or more users. In this example, a user can be an insurance agent or a customer who wants to obtain one or more insurance product(s) that best fit the needs of the customer.

In other embodiments, the user can provide additional insurance-needs data to the insurance needs engine via client computing devices to modify the insurance-needs data previously identified by the insurance recommendation module at step 602. In these embodiments, the insurance recommendation module processes said additional insurance-needs data and then generates and displays an insurance-product recommendation that best fit the insurance needs and/or future goals of the customer based on said additional insurance-needs data and the full profile associated with the customer. Thus, if the user desires to modify the previously identified insurance needs, then method 600 advances to step 602 to establish a new set of insurance needs and generates a new/modified insurance-product recommendation for the customer. Alternatively, if the user desires to validate and/or modify one or more fields of the full profile associated with the customer, then method 600 advances to step 514 of method 500 of FIG. 5, to validate and/or modify one or more pre-populated fields of the full profile associated with the customer.

Figure 7:
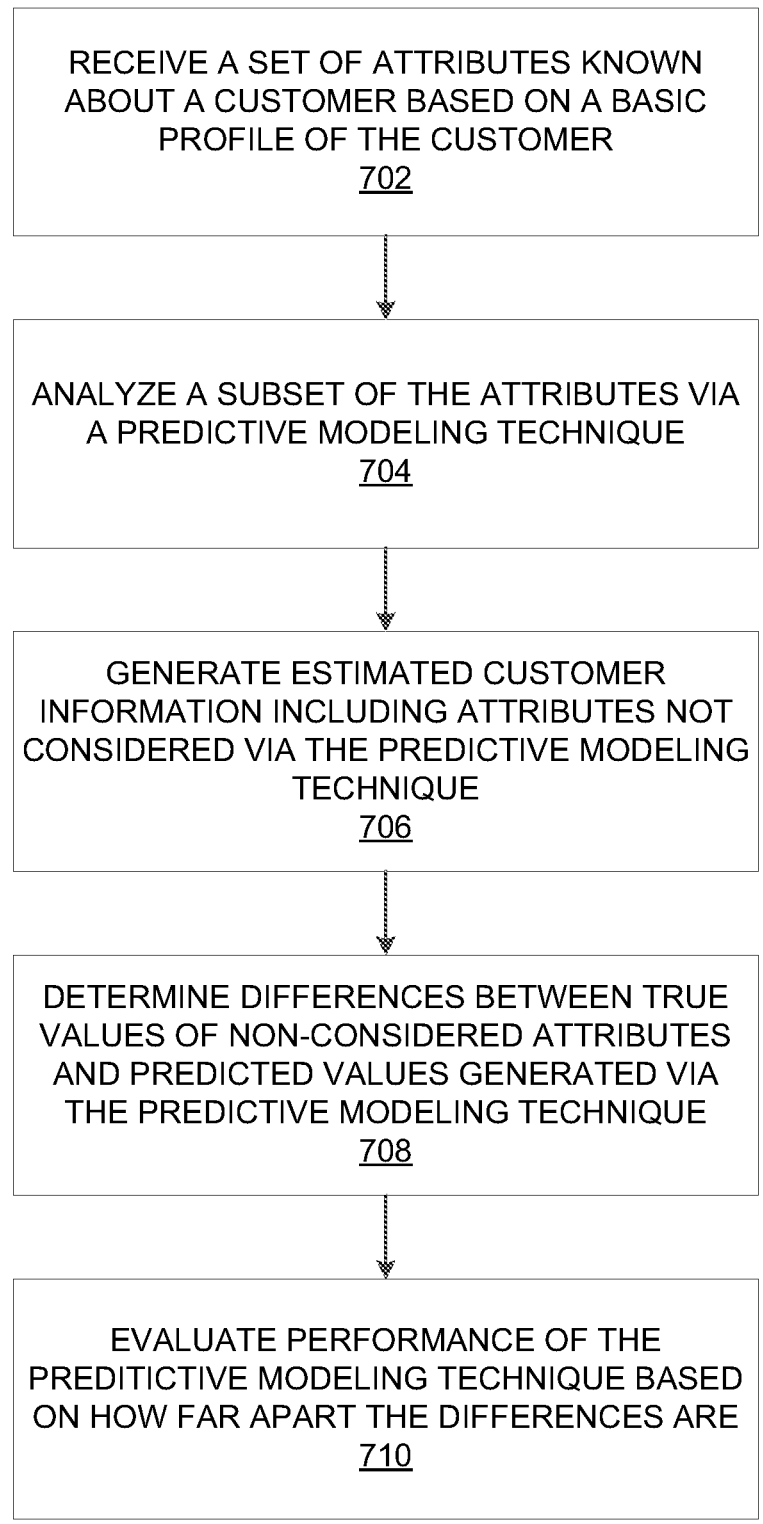
FIG. 7 is a flow diagram describing a method for evaluating a predictive modeling technique, according to an embodiment.

FIG. 7 is a flow diagram describing a method for evaluating a predictive modeling technique, according to an embodiment. In an embodiment, method 700 seeks to identify true and false values for user attributes. In another embodiment, the true and false values may be used in order to update a machine learning or cognitive aspect of the present disclosure. For example, the prediction module may use the false values or the prediction evaluation to update a neural network or a similar nodal structure in order to improve future predictions. In some implementations, certain steps of method 700 can be combined, performed simultaneously, or in a different order, without deviating from the objective of method 700.

At step 702, the prediction module determines whether there is a set of basic attributes known about a customer based on the basic profile of the customer. Customer attributes may, in one embodiment, be received by the user interacting with the user interface of one or more of the client computing devices and analyzed as described in FIG. 5.

At step 704, the prediction module analyzes a portion of the basic attributes from the basic attributes known about the customer. The prediction module may employ, in an embodiment, a nearest neighbor algorithm as described in FIG. 5. In an example, the prediction module may identify 150 customer attributes and only analyze 130.

At step 706, the prediction module generates estimated customer information for the customer attributes not considered by the predictive modeling. For example, data including those 20 basic attributes known about the customer which have not been considered in the prediction process.

At step 708, the prediction module calculates the difference between the true values of the known basic customer attributes, such as the 20 known basic customer attributes.

At step 710, the prediction module evaluates the performance of the predictive modeling technique by evaluating the difference between the true values and predictive values of the customer attributes. The evaluation, in one embodiment, revolves around the logic that the more similar the two values, the better the predictive modeling technique. In an embodiment, this evaluation may be quantified and, depending on whether the evaluation satisfies a pre-determined threshold, the predictive modeling technique may be used for similar customers.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middle-ware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   receiving, by a profile analytics engine server, inputted user data stored in a first database that is internal, wherein the inputted user data is associated with a user;
   generating, by the profile analytics engine server, a first instruction to a second database to transmit additional data associated with the user based upon the inputted user data, wherein the second database is external, server-based, and remote from the profile analytics engine server;
   upon transmitting the first instruction to the second database, receiving and storing, by the profile analytics engine server, additional user data transmitted from the second database in the first database, wherein the additional user data is associated with the user;
   generating, by the profile analytics engine server, in the first database a customer profile for the user based on the inputted user data and the additional user data;

determining, by the profile analytics engine server, missing data in the customer profile;
determining, by the profile analytics engine server, a set of attributes of the user based on the customer profile;
identifying, by the profile analytics engine server, at least one profile in the first database having the set of attributes;
generating, by the profile analytics engine server, using a predictive model, estimated data for the missing data based upon the at least one profile having the set of attributes;
generating, by the profile analytics engine server, a second instruction to update the customer profile in the first database to include the estimated data for the missing data;
upon transmitting the second instruction to the first database, determining, by the profile analytics engine server, a financial priority for the updated customer profile; and
generating, by the profile analytics engine server, a product recommendation for the updated customer profile using a needs algorithm based upon the financial priority, wherein at least one of:
the predictive model employs a persona as training data, wherein the persona is stored in the first database, wherein the persona comprises non-personally identifiable data derived from the customer profile, or
the profile analytics engine server is configured to prioritize the set of attributes based on an attribute type and analyze the set of attributes via the predictive model based on such prioritization.

2. The method of claim 1, wherein the product recommendation is a first product recommendation, and further comprising:
identifying, by the profile analytics engine server, a second product recommendation based at least in part on the financial priority and the customer profile; and
generating and transmitting, by the profile analytics engine server, a third instruction to present the second product recommendation to a user computing device such that the user is able to at least one of confirm the second product recommendation via the user computing device and modify the financial priority via the user computing device such that the second product recommendation is updated accordingly via the profile analytics engine server.

3. The method of claim 1, wherein the predictive model employs a persona as training data, wherein the persona is stored in the first database, wherein the persona comprises non-personally identifiable data derived from the customer profile.

4. The method of claim 1, wherein the profile analytics engine server is configured to prioritize the set of attributes based on an attribute type and analyze the set of attributes via the predictive model based on such prioritization.

5. The method of claim 1, further comprising:
generating, by the profile analytics engine server, a fourth instruction to display the updated customer profile on a user computing device.

6. The method of claim 5, further comprising:
upon transmitting the fourth instruction, receiving, by the profile analytics engine server, a modification to the updated customer profile from the user via the user computing device; and
generating, by the profile analytics engine server, a third insurance product recommendation for the modified updated customer profile using the needs algorithm based upon the financial priority.

7. The method of claim 6, wherein the profile analytics engine server is configured to evaluate a performance of the predictive model based at least in part on the user modifying the updated customer profile and to take a corrective action accordingly.

8. The method of claim 5, further comprising:
upon transmitting the fourth instruction, receiving, by the profile analytics engine server, a verification from the user that the estimated data for the missing data in the updated customer profile is acceptable.

9. A system comprising:
a first database that is internal;
a second database;
a profile analytics engine server coupled to the first database and to the second database, wherein the second database is external, server-based, and remote from the profile analytics engine server, wherein the profile analytics engine server is configured to:
receive inputted user data stored in the first database, wherein the inputted user data is associated with a user;
generate a first instruction to the second database to transmit additional data associated with the user based upon the inputted user data;
upon transmitting the first instruction to the second database, receive and store additional user data transmitted from the second database in the first database, wherein the additional user data is associated with the user;
generate in the first database a customer profile for the user based on the inputted user data and the additional user data;
determine missing data from the customer profile;
determine a set of attributes of the user based on the customer profile;
identify at least one profile in the first database having the set of attributes;
generate, using a predictive model, estimated data for the missing data based upon the at least one profile having the set of attributes;
generate a second instruction to update the customer profile in the first database to include the estimated data for the missing data;
upon transmitting the second instruction to the first database, determine a financial priority for the updated customer profile; and
generate a product recommendation for the updated customer profile using a needs algorithm based upon the financial priority, wherein at least one of:
wherein the predictive model employs a persona as training data, wherein the persona is stored in the first database, wherein the persona comprises non-personally identifiable data derived from the customer profile, or
wherein the profile analytics engine server is configured to prioritize the set of attributes based on an attribute type and analyze the set of attributes via the predictive model based on such prioritization.

10. The system of claim 9, wherein the profile analytics engine server is further configured to:
generate a second product recommendation based at least in part on the financial priority and the customer profile; and generate and transmit a third instruction to present the second product recommendation on a user computing device such that the user is able to at least one of confirm the second product recommendation via the user computing device and modify the financial priority via the user computing device such that the second product recommendation is updated accordingly via the profile analytics engine server.

11. The system of claim 9, wherein the predictive model employs a persona as training data, wherein the persona is stored in the first database, wherein the persona comprises non-personally identifiable data derived from the customer profile.

12. The system of claim 9, wherein the profile analytics engine server is configured to prioritize the set of attributes based on an attribute type and analyze the set of attributes via the predictive model based on such prioritization.

13. The system of claim 9 wherein the server is further configured to:
generate a fourth instruction to display the updated customer profile on a user computing device.

14. The system of claim 13, wherein the server is further configured to:
upon transmitting the fourth instruction, receive a modification to the updated customer profile from the user via the user computing device; and
identify a third insurance product recommendation for the modified updated customer profile using the needs algorithm based upon the financial priority.

15. The system of claim 14, wherein the profile analytics engine server is configured to evaluate a performance of the predictive model based at least in part on the user modifying the updated customer profile and to take a corrective action accordingly.

16. The system of claim 13, wherein the server is further configured to:
upon transmitting the fourth instruction, receive a verification from the user that the estimated data for the missing data in the updated customer profile is acceptable.

* * * * *